(12) United States Patent
Alford et al.

(10) Patent No.: US 11,588,836 B2
(45) Date of Patent: Feb. 21, 2023

(54) SYSTEMS AND METHODS RELATING TO NEURAL NETWORK-BASED API REQUEST PATTERN ANALYSIS FOR REAL-TIME INSIDER THREAT DETECTION

(71) Applicant: Genesys Cloud Services, Inc., Menlo Park, CA (US)

(72) Inventors: William Anthony Alford, Durham, NC (US); Megan Amberly Thornton, Provo, UT (US); Andrew Tyler Harwood, Yulee, FL (US); Danny Rappleyea, Durham, NC (US)

(73) Assignee: Genesys Cloud Services, Inc., Menlo Park, CA (US)

(*) Notice: Subject to any disclaimer, the term of this patent is extended or adjusted under 35 U.S.C. 154(b) by 16 days.

(21) Appl. No.: 17/360,198

(22) Filed: Jun. 28, 2021

(65) Prior Publication Data
US 2021/0409430 A1    Dec. 30, 2021

Related U.S. Application Data

(60) Provisional application No. 63/044,416, filed on Jun. 26, 2020.

(51) Int. Cl.
*H04L 41/16* (2022.01)
*H04L 9/40* (2022.01)
*H04L 67/133* (2022.01)

(52) U.S. Cl.
CPC .......... *H04L 63/1416* (2013.01); *H04L 41/16* (2013.01); *H04L 67/133* (2022.05)

(58) Field of Classification Search
CPC ... H04L 63/1416; H04L 41/16; H04L 67/133; H04L 63/10
See application file for complete search history.

(56) References Cited

U.S. PATENT DOCUMENTS

| | | | |
|---|---|---|---|
| 10,360,062 B2 * | 7/2019 | Lietz | H04L 63/1425 |
| 10,673,880 B1 * | 6/2020 | Pratt | H04L 63/1433 |
| 10,721,262 B2 * | 7/2020 | Zorlular | H04L 41/06 |
| 11,323,464 B2 * | 5/2022 | Jakobsson | H04L 63/1425 |
| 2004/0015719 A1 * | 1/2004 | Lee | H04L 63/0227 709/224 |

(Continued)

OTHER PUBLICATIONS

Amazon Web Services, Inc.; Amazon GuardDuty; Retrieved on: Jun. 25, 2021; 15 pages.

(Continued)

*Primary Examiner* — Aftab N. Khan
(74) *Attorney, Agent, or Firm* — Taft Stettinius & Hollister LLP

(57) ABSTRACT

A method of neural network-based pattern analysis for real-time threat detection according to an embodiment includes receiving a real-time request for a system resource from a user of the system, determining a user identifier associated with the user of the system, retrieving a set of recent requests associated with the user identifier from a short-term buffer, analyzing, using machine learning, the real-time request based on the set of recent requests and a neural network model to determine whether the real-time request is suspicious, and flagging the real-time request as a suspicious request in response to a determination that the real-time request is suspicious.

18 Claims, 4 Drawing Sheets

(56) References Cited

U.S. PATENT DOCUMENTS

| | | | | |
|---|---|---|---|---|
| 2005/0188079 | A1* | 8/2005 | Motsinger | H04L 63/1416 709/224 |
| 2010/0235918 | A1* | 9/2010 | Mizrahi | H04L 63/168 726/25 |
| 2016/0352766 | A1* | 12/2016 | Flacher | H04L 12/28 |
| 2020/0137084 | A1* | 4/2020 | Roy | H04L 63/1416 |
| 2021/0037054 | A1* | 2/2021 | Shultz | H04L 63/20 |
| 2021/0112091 | A1* | 4/2021 | Compton | H04L 63/1416 |

OTHER PUBLICATIONS

Shen, Yun et al.; Tiresias: Predicting Security Events Through Deep Learning; Proceedings of the 2018 ACM SIGSAC Conference on Computer and Communications Security; Oct. 15, 2018; pp. 592-605; Association for Computing Machinery.

Kang, Wang-Cheng et al.; Self-Attentive Sequential Recommendation; 2018; 10 pages.

Amazon Web Services, Inc.; Amazon Kinesis; Retrieved on: Jun. 25, 2021; 12 pages.

Amazon Web Services, Inc.; Amazon Kinesis Data Firehose; Retrieved on: Jun. 25, 2021; 10 pages.

Amazon Web Services, Inc.; Amazon S3; Retrieved on: Jun. 25, 2021; 14 pages.

Amazon Web Services, Inc.; Amazon Athena; Retrieved on: Jun. 25, 2021; 9 pages.

Amazon Web Services, Inc.; AWS Lambda; Retrieved on: Jun. 25, 2021; 14 pages.

GENESYS; Genesys Cloud CX Platform; Retrieved on: Jun. 25, 2021; 6 pages.

Du, Min et al.; DeepLog: Anomaly Detection and Diagnosis from System Logs through Deep Learning; 2017; 14 pages; ACM.

Vaswani; Ashish et al.; Attention Is All You Need; 31st Conference on Neural Information Processing Systems (NIPS 2017); Dec. 6, 2017; 15 pages.

TENSORFLOW; Machine learning education; Retrieved on: Jun. 25, 2021; 25 pages.

Amazon Web Services, Inc.; Amazon SageMaker; Retrieved on: Jun. 25, 2021; 20 pages.

\* cited by examiner

SYSTEMS AND METHODS RELATING TO NEURAL NETWORK-BASED API REQUEST PATTERN ANALYSIS FOR REAL-TIME INSIDER THREAT DETECTION

CROSS-REFERENCE TO RELATED APPLICATIONS

This application claims priority to and the benefit of U.S. Provisional Application No. 63/044,416, titled "Systems and Methods Relating to Neural Network-Based API Request Pattern Analysis for Real-Time Insider Threat Detection," filed on Jun. 26, 2020, the contents of which are incorporated herein by reference in their entirety.

BACKGROUND

Cyberattacks and other malicious attacks on enterprise and organizational computing systems often involve internal actors. Unfortunately, insider attacks are typically also the costliest to fix and more difficult to detect, especially in large-scale software systems with hundreds or thousands of users. Typical strategies for insider threat detection involve monitoring user behavior for anomalies. For example, one technique for anomaly detection is to create a set of rules (e.g., thresholds on number of logins, activity after normal business hours, activity from a certain source IP addresses, etc.). Although such rules are certainly good safeguards to incorporate into a security system, there are some downsides to relying on such rules alone. For example, for a customer who runs global contact centers that operate around the clock, schedule-based rules may not work well. Further, research shows that a majority of insider attacks actually occur during normal business hours. Also, with the burgeoning of remote and hybrid work environments, managing IP address whitelists becomes more difficult. Importantly, rules-based systems also often need tuning, especially as attack patterns change.

SUMMARY

One embodiment is directed to a unique system, components, and methods for neural network-based API request pattern analysis for real-time threat detection. Other embodiments are directed to apparatuses, systems, devices, hardware, methods, and combinations thereof for neural network-based API request pattern analysis for real-time threat detection.

According to an embodiment, a method of neural network-based pattern analysis for real-time threat detection may include receiving, by a system, a real-time request for a system resource from a user of the system, determining, by the system, a user identifier associated with the user of the system, retrieving, by the system, a set of recent requests associated with the user identifier from a short-term buffer, analyzing, by the system using machine learning, the real-time request based on the set of recent requests and a neural network model to determine whether the real-time request is suspicious, and flagging, by the system, the real-time request as a suspicious request in response to a determination that the real-time request is suspicious.

In some embodiments, flagging the real-time request as the suspicious request may include storing data associated with the real-time request in a suspicious request history database.

In some embodiments, the method may further include automatically disabling, by the system, the user's ability to submit requests to the system in response to flagging at least a threshold number of real-time requests as suspicious requests.

In some embodiments, receiving the real-time request for the system resource may include receiving real-time request metadata via an application programming interface (API) of the system.

In some embodiments, the method may further include transmitting, by the system, the real-time request metadata to a message bus, and analyzing the real-time request may include extracting the real-time request metadata from the message bus.

In some embodiments, the method may further include training, by the system, the neural network model based on the real-time request metadata.

In some embodiments, the set of recent requests may include up to twenty most recent requests by the user.

In some embodiments, analyzing the real-time request based on the set of recent requests and the neural network model may include determining, for each system resource of a plurality of system resources, a probability that a next real-time request is associated with the corresponding system resource.

In some embodiments, determining that the real-time request is suspicious may include determining a set of the next real-time requests having greatest corresponding probabilities, and determining that the real-time request is suspicious in response to determining that the real-time request is not included in the set of the next real-time requests having the greatest corresponding probabilities.

In some embodiments, the set of the next real-time requests may be a configurable number of requests.

In some embodiments, determining that the real-time request is suspicious may include determining that a probability of the real-time request is the next real-time request is below a threshold probability.

According to another embodiment, a system for neural network-based pattern analysis for real-time threat detection may include at least one processor and at least one memory comprising a plurality of instructions stored thereon that, in response to execution by the plurality of instructions, causes the system to receive a real-time request for a system resource from a user of the system via an application programming interface (API) of the system, determine a user identifier associated with the user of the system, retrieve a set of recent requests associated with the user identifier from a short-term buffer, analyze, using machine learning, the real-time request based on the set of recent requests and a neural network model to determine whether the real-time request is suspicious, and flag the real-time request as a suspicious request in response to a determination that the real-time request is suspicious.

In some embodiments, the at least one memory may include a suspicious request history database, and to flag the real-time request as the suspicious request may include to store data associated with the real-time request in the suspicious request history database.

In some embodiments, the plurality of instructions may further cause the system to automatically disable the user's ability to submit requests to the system in response to a determination that at least a threshold number of real-time requests have been flagged as suspicious requests.

In some embodiments, the plurality of instructions may further cause the system to transmit the real-time request to a message bus, and to analyze the real-time request may include to extract the real-time request from the message bus.

In some embodiments, the plurality of instructions may further cause the system to train the neural network model based on the real-time request.

In some embodiments, the set of recent requests may be up to twenty most recent requests by the user.

In some embodiments, to analyze the real-time request based on the set of recent requests and the neural network model may include to determine, for each system resource of a plurality of system resources, a probability that a next real-time request is associated with the corresponding system resource.

In some embodiments, to determine that the real-time request is suspicious may include to determine a set of the next real-time requests having greatest corresponding probabilities, and determine that the real-time request is suspicious in response to a determination that the real-time request is not included in the set of the next real-time requests having the greatest corresponding probabilities.

In some embodiments, to determine that the real-time request is suspicious may include to determine that a probability of the real-time request is the next real-time request is below a threshold probability.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
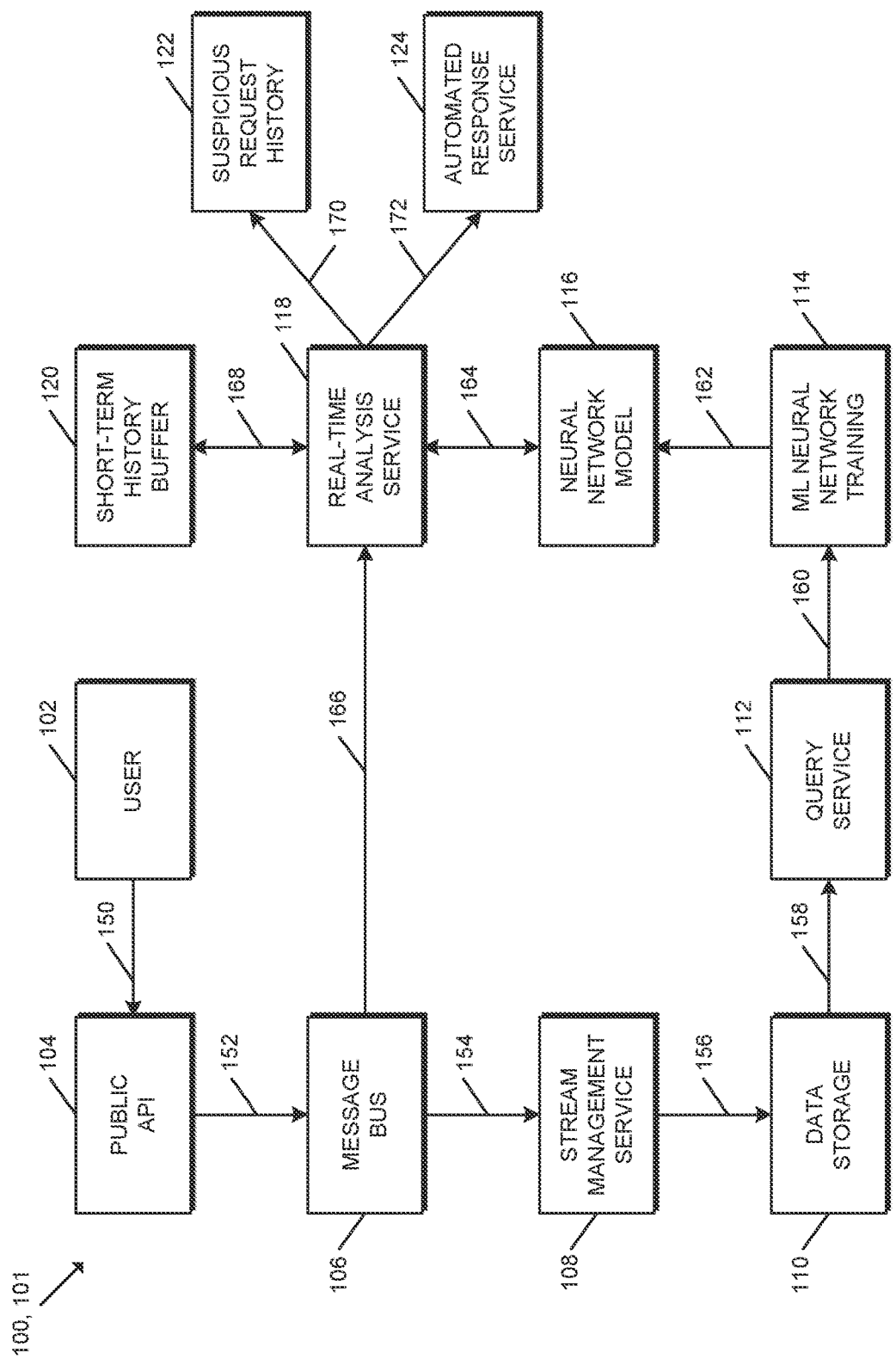
FIG. 1 depicts a simplified system flow diagram of at least one embodiment of a system and method for neural network-based API request pattern analysis for real-time insider threat detection.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, a system flow diagram of a system 100 and method 101 for neural network-based API request pattern analysis for real-time insider threat detection is shown. The illustrative system 100 includes a user 102, a public API 104, a message bus 106, a stream management service 108, a data storage 110, a query service 112, a machine learning (ML) neural network training service 114, a neural network model 116, a real-time analysis service 118, a short-term history buffer 120, a suspicious request history 122, and an automated response service 124. Although only one user 102, one public API 104, one message bus 106, one stream management service 108, one data storage 110, one query service 112, one machine learning (ML) neural network training service 114, one neural network model 116, one real-time analysis service 118, one short-term history buffer 120, one suspicious request history 122, and one automated response service 124 are shown in the illustrative embodiment of FIG. 1, the system 100 may include multiple users 102, public APIs 104, message buses 106, stream management services 108, data storages 110, query services 112, machine learning (ML) neural network training services 114, neural network models 116, real-time analysis services 118, short-term history buffers 120, suspicious request histories 122, and/or automated response services 124 in other embodiments. For example, in some embodiments, multiple users 102 may be configured to communicate with the system 100 via the same public API 104. In some embodiments, one or more of the systems, services, and/or components described herein may be excluded from the system 100, one or more of the systems, services, and/or components described as being independent may form a portion of another system, service, and/or component, and/or one or more features of the systems, services, and/or components may be independent.

Figure 2:
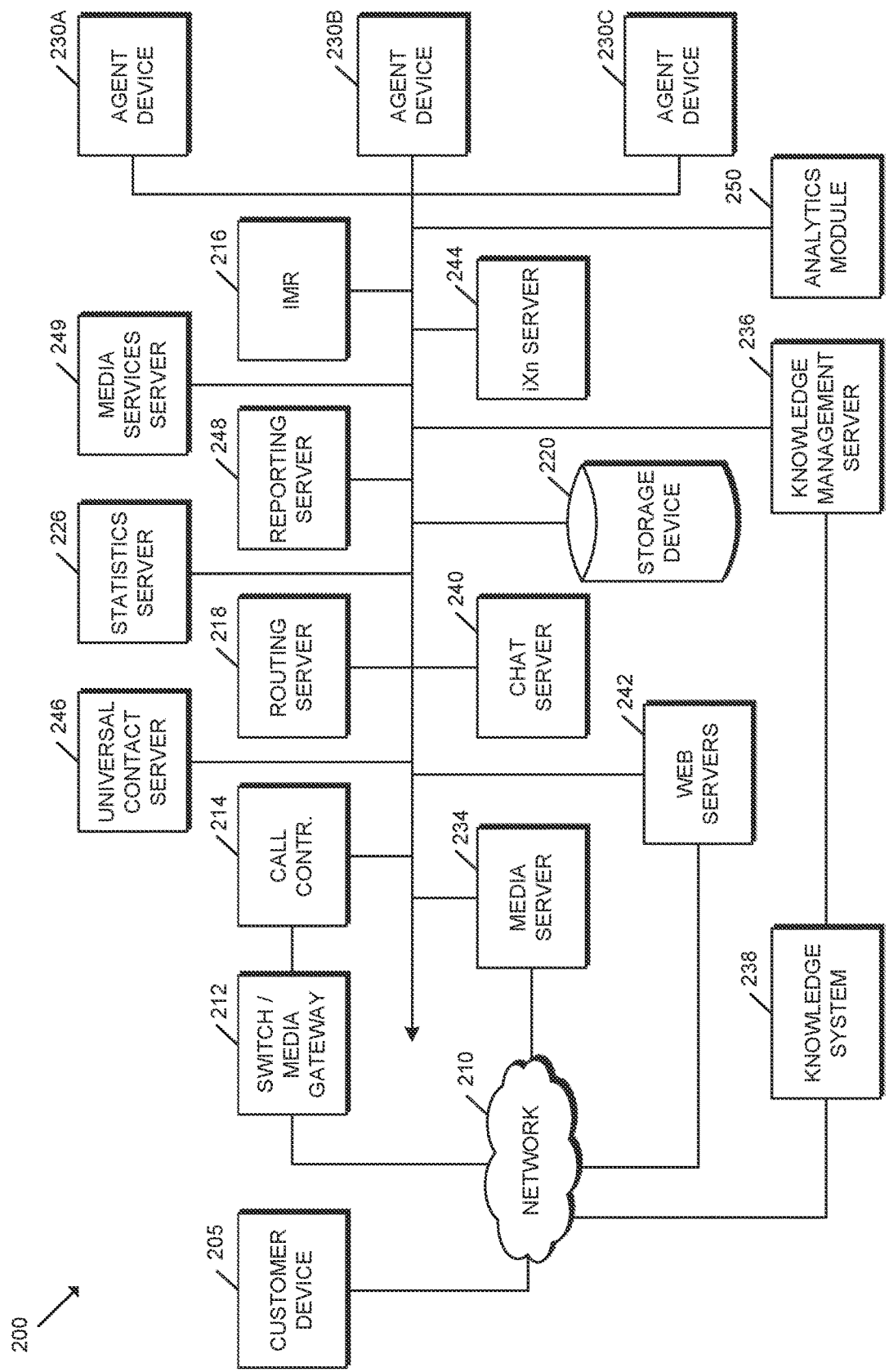
FIG. 2 is a simplified block diagram of at least one embodiment of a call center system.
Figure 3:
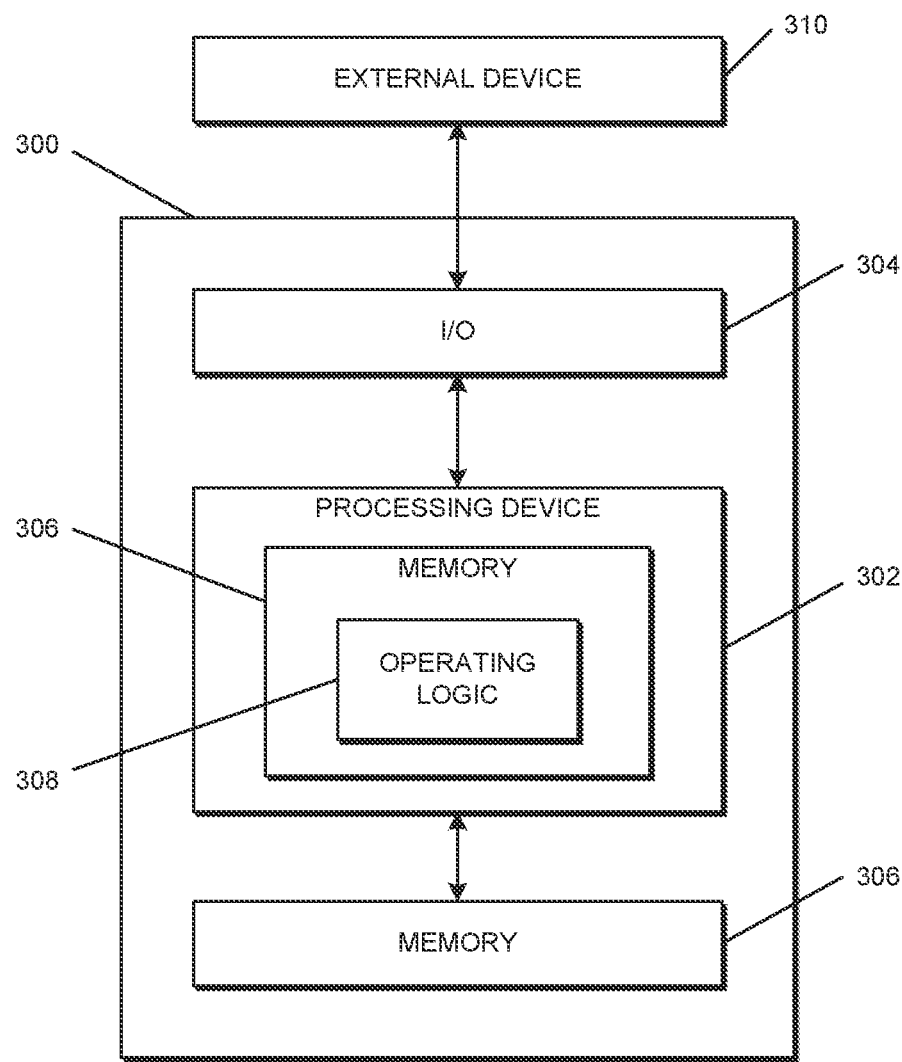
FIG. 3 is a simplified block diagram of at least one embodiment of a computing system.

It should be appreciated that each of the user 102, the public API 104, the message bus 106, the stream management service 108, the data storage 110, the query service 112, the machine learning (ML) neural network training service 114, the neural network model 116, the real-time analysis service 118, the short-term history buffer 120, the suspicious request history 122, and the automated response service 124 may be embodied as, executed by, or associated with any type of device/system, collection of devices/systems, and/or portion(s) thereof suitable for performing the functions described herein (e.g., the computing device 300 of FIG. 3). Further, in some embodiments, the system 100 and/or a portion thereof may be embodied as a cloud-based system as described below. In some embodiments, one or more features of the system 100 may form a portion of or involve a contact center system similar to the contact center system 200 of FIG. 2. For example, in some embodiments, the user 102 may interact with a public API 104 associated with the contact center system 200.

It should be appreciated that the technologies described herein allow for the detection of malicious behavior by authorized users 102 of the system 100 (e.g., a cloud computing system such as the Genesys Cloud system). It should be appreciated that the Genesys cloud system is an omni-channel SaaS-based contact center system (e.g., such as the contact center system 200) virtually hosted via a cloud service provider (e.g., via Amazon Web Services (AWS) and/or another suitable cloud-service provider). In the some embodiments, users 102 may interact with the system 100 via HTTP requests (or other types of requests) to the public API 104. In some embodiments, some or more (e.g., all) of the user 102 interactions with the system 100 may occur through the public APIs 104. In some embodiments, one or more of the public APIs 104 may be embodied as an HTTP REST API (or, HTTP RESTful API), and each user request may be authenticated (e.g., via OAuth 2.0 or otherwise), such that contact centers and/or other customers can apply fine-grained access control to restrict what individual users 102 can do. It should be appreciated that the Genesys Cloud platform (or system 100) may host hundreds of thousands of users 102 making billions of API requests each month. Such requests may include activities from a standard user interface, custom-built integrations, and/or third-part plugins.

Unchecked, users 102 who behave maliciously could potentially extract sensitive customer data or perform other "hacking" operations such as destroying or tampering with data. Because of the scale of requests, it can be difficult to detect this behavior out of thousands of normal, benign requests. However, the techniques described herein allow for a user's request activity to be monitored as a proxy for user behavior, and because a real-time stream of API request activity is available, the system 100 can monitor user behavior for anomalies in real time. More concretely, the techniques described herein increase the security of the system 100 (e.g., Genesys Cloud platform) by automatically detecting "insider threats," which could cost businesses millions of dollars as well as loss of trust.

Some systems tackle anomaly detection by using self-supervised sequence learning for anomaly detection. Self-supervised sequence learning functions by taking a historical sequence of events and predicting the next event in the sequence, which is extraordinarily successful for many tasks (e.g., in natural language processing). In the security space, some systems use Recurrent Neural Networks (RNNs) as the model architecture. For example, some systems uses sequence learning on "security events" collected from intrusion detection systems that run on individual machines. These events happen when the intrusion detection system detects an attempt to exploit a known vulnerability. Given that most successful attacks involve exploiting multiple vulnerabilities, predicting the next one in a sequence allows security teams to gauge the severity and risk of an impending attack. Another system analyzes events parsed from system logs and detects "system execution misbehavior," such as slowness due to denial of service (DOS) or attacks that cause server restarts. The system may also parse intrusion detection logs. Such solutions, however, typically operate at the physical or machine layer. By contrast, the API request data of the subject technology is at the application layer, and the records include the user identity.

As described in further detail below, the system 100 described herein includes a real-time data collection system, which may analyze and archive metadata about each API request, including the request timestamp, target URI/URL, user identifier, and/or other relevant information associated with the request. The data archive may be used for offline training of a neural network which, given a sequence of past API requests by a user, can predict the top-N most likely next requests. When a new request occurs, the data collection system may pass it to the neural network in real time to determine the top-N most likely predictions. If the current request is not in the top-N most likely requests list, the request may be flagged as suspicious. Depending on the particular embodiment, the flagged requests may be reviewed by an administrator, and/or the system may automatically disable one or more user functionalities for that user if the user's flagged requested exceeds a specified threshold number of flagged requests within a specified time window.

Figure 4:
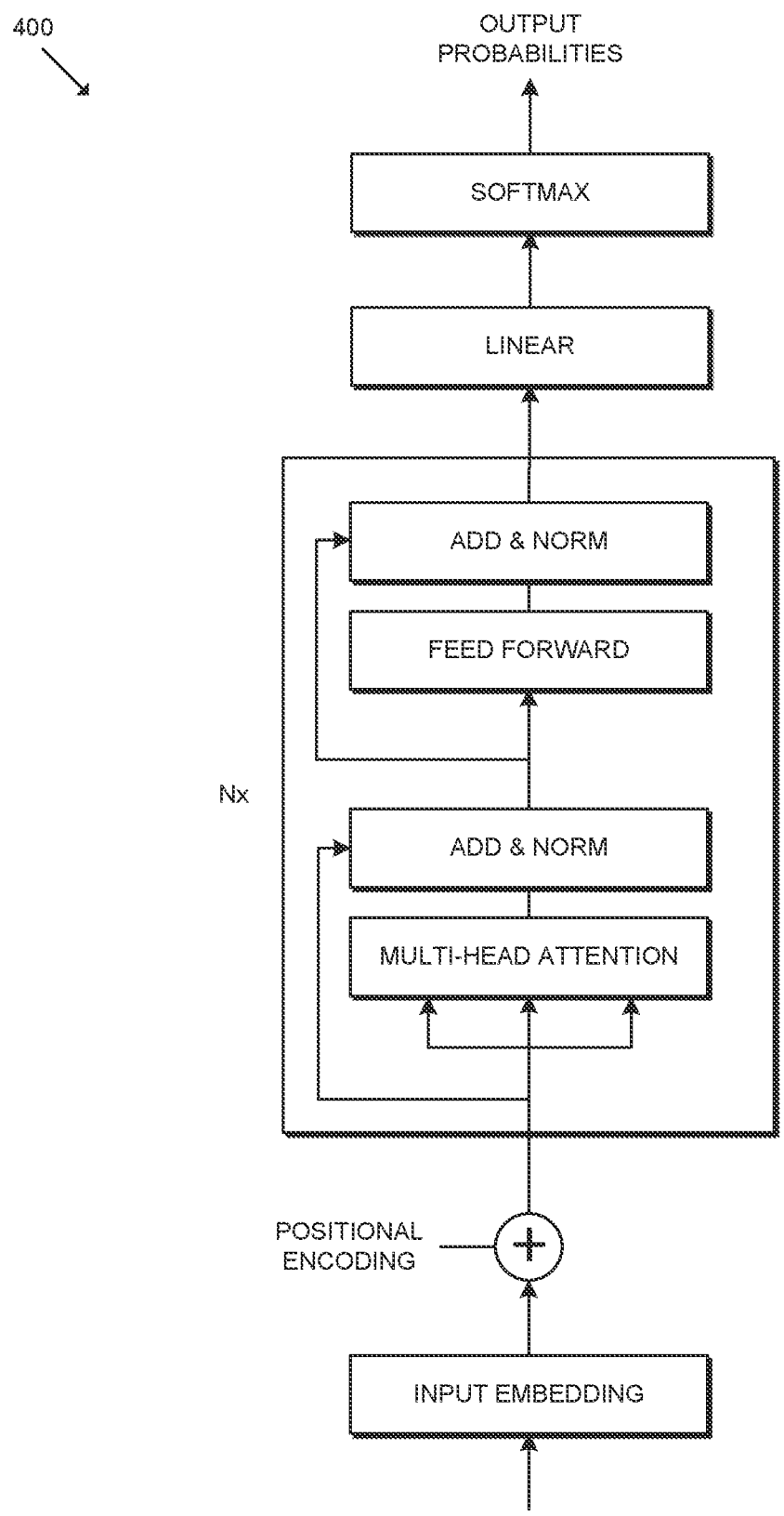
FIG. 4 is a simplified block diagram of at least one embodiment of a neural network architecture/model involving multi-head attention.

In some embodiments, the system 100 may utilize a neural network architecture/model involving multi-head attention similar to the neural network model 400 depicted in FIG. 4. As shown, the neural network model 400 leverages a transformer-like architecture. The illustrative neural network model 400 is particularly well-suited for real-time insider threat detection as it outperforms many other approaches (e.g., Recurrent Neural Network (RNN) approaches), and the explicit modeling of users is unnecessary (thereby eliminating a potential data privacy concern related to the collection/storage of users' personal information). In the illustrative embodiment, the input is a sequence of request URIs/URLs, which are mapped into an embedding space. The input items also have their encoded position added. This process is followed by a series of "transformer" blocks, which consist of a multi-head self-attention sublayer followed by a feed-forward sublayer. There are residual connections around each of them, and each is followed by a layer normalization. The output of the last block is then remapped from embedding space back to URI/URL space, and Softmax is leveraged to create a probability distribution.

In use, the system 100 may execute the method 101 of FIG. 1 for neural network-based API request pattern analysis for real-time insider threat detection. As shown, the illustrative method 101 includes flows 150-172. It should be appreciated that the particular flows of the method 101 are illustrated by way of example, and such blocks may be combined or divided, added or removed, and/or reordered in whole or in part depending on the particular embodiment, unless stated to the contrary.

The illustrative method 101 begins with flow 150 in which the user 102 makes a request to the public API 104 (e.g., the Genesys Cloud public API). In flow 512, the API server 104 sends the request metadata associated with the request (e.g., including the requested URI/URL, a user identifier associated with the user (or user device) making the request, and/or other relevant metadata) to the message bus 106. It should be appreciated that, in some embodiments, the message bus 106 may be embodied as a real-time streaming service and/or high-throughput event bus (e.g., AWS Kinesis or Apache Kafka). In the illustrative embodiment, it should be appreciated that a metadata record about each incoming API request is sent to the message bus 106; however, in other embodiments, a subset of such requests may be sent to the bus 106. The metadata records may include one or more metadata fields regarding the API request such as, for example, the requested URI/URL, a user identifier associated with the user (or user device) making the request, and/or other relevant metadata. It should be appreciated that each requested URI/URL is, or is associated with, one or more system resources (e.g., a web page, file, data element, etc.).

It should be appreciated that the message bus 106 may have multiple consumers, and the message bus 106 may include a "built in" stream management service 108 (e.g., AWS Firehose) that allows for the consumption or retrieval of messages from the message bus 106 for processing. Accordingly, in flow 154, the stream management service 108 may consume/retrieve the metadata from the message bus 106 and, in flow 156, the stream management service 108 may store the retrieved metadata to the data storage 110. For example, in some embodiments, the data storage 110 may be embodied as cloud-based data storage (e.g., an AWS S3 bucket, object store, etc.) and/or another suitable form of data storage 110. In flow 158, the metadata may be stored/imported into the query service 112 (e.g., AWS Athena) or, more specifically, a database thereof. Although described as a "database," it should be appreciated that the database of the query service 112 may be any type of data structure(s) consistent with the technologies described herein.

The stored metadata may be used for training the machine learning neural network model 116 (e.g., having the architecture 400 of FIG. 4). As described herein, the neural network may be leveraged to detect suspicious requests. In the illustrative embodiment, because a dataset containing a history of requests that are marked as either normal or malicious is not readily available, unsupervised machined learning is used to detect anomalies. However, it should be appreciated that supervised machine learning may be used in other embodiments (e.g., if/when such a dataset is available). Accordingly, in flow 160, the machine learning neural network training service 114 queries the query service 112 for, or otherwise retrieves, the request metadata (alone or in addition to other request metadata) from the database of the query service 112.

It should be appreciated that the anomaly detection problem may be framed as the public API 104 exposing a defined/discrete set of possible HTTP requests (e.g., corresponding with a finite number of accessible URIs/URLs) and, given a user's historic behavior patterns (including a relatively small sequence of previous request URIs/URLs), the neural network learns the probability that the user would next make an API request for each possible accessible URI/URL. Accordingly, in flow 162, the machine learning neural network training service 114 trains (e.g., updates the weights associated with) the neural network model 116 by monitoring actual API requests made by the user(s) over time. In some embodiments, the neural network is based on an attention mechanism used to learn from sequences of requests. Further, in some embodiments, the neural network include user-level features for improved per-user customization.

As shown by flow 164, after the neural network model 116 has been sufficiently trained, it can be deployed in real time using the real-time analysis service 118. In particular, for each incoming user API request stored to the message bus 106, the real-time analysis service 118 may be invoked in flow 166. In some embodiments, it should be appreciated that the real-time analysis service 118 may be embodied as a "serverless" compute service (e.g., AWS Lambda). In the illustrative embodiment, in flow 168, the real-time analysis service 118 reads a set (e.g., sequence) of previous API requests (e.g., for a corresponding URI/URL) made by the user from the short-term history buffer 120. In particular, in some embodiments, the real-time analysis service 118 may read the metadata associated with the previous API requests (e.g., the requested URIs/URLs, the user identifier associated with the user (or user device), and/or other relevant metadata). It should be appreciated that the number of previous requests stored in the short-term history buffer 120 may vary depending on the particular embodiment. For example, in some embodiments, the short-term history buffer 120 may include the twenty most request requests made by the user (or fewer if fewer than twenty requests have been made). In some embodiments, the short-term history buffer 120 may be embodied as a high-throughput caching system (e.g., Redis). Further, in some embodiments, each user may be associated with its own short-term history buffer 120 such that all requests associated with a particular user identifier are stored to that short-term history buffer 120 (and the oldest removed/bumped when the maximum number of requests stored to the buffer 120 is reached).

The real-time analysis service 118 uses the short-term request history with the neural network model 116 to determine whether the real-time request received from the message bus 106 (in flow 166) is suspicious. In particular, as described above, the neural network returns a probability that the user would next make an API request for each possible accessible URI/URL (e.g., system resource), and the probability of the real-time request (i.e., the incoming request) is evaluated to determine if the request is suspicious (e.g., as a model inference). For example, in various embodiments, if the probability of the real-time request is not one of the requests in the top-N (e.g., a configurable number) greatest probabilities and/or if the probability of the real-time request is lower than some probability threshold (e.g., a configurable number), the request may be flagged as suspicious and recorded, in flow 170, in the suspicious request history 122 and/or addressed, in flow 172, via an automated response service 124.

In other words, in some embodiments, the real-time analysis service 118 determines a set (e.g., including N elements) of the next real-time requests having the greatest corresponding probabilities, and determines that the real-time request is suspicious if the real-time request is not included in the set. In other embodiments, the real-time analysis service 118 may determine that the real-time request is suspicious if the probability that the request is the next real-time request is below some predefined probability threshold. It should be appreciated, however, that the real-time analysis service 118 may otherwise determine a real-time request to be suspicious based on the short-term history buffer 120 data and/or the neural network model 116 in other embodiments.

It should be appreciated that the suspicious request history 122 may be embodied as a database, table, and/or other suitable data structure depending on the particular embodiment. Further, in some embodiments, the short-term history buffer 120 and the suspicious request history 122 may form portions of the same data structure. In some embodiments, the suspicious request history 122 may be reviewed by an administrator (e.g., offline) in order to determine whether to further investigate the suspicious activity. Additionally or alternatively, in some embodiments, the automated response service 124 may automatically respond to the suspicious request. For example, in some embodiments, the automated response service 124 may automatically disable the user's ability to submit requests to the system 100 (and/or disable some other functionality) if at least a threshold number (e.g., a configurable number) of suspicious requests occur within a predefined time window (e.g., a configurable interval). Further, in some embodiments, the thresholds necessary to trigger an automated response may vary depending on various characteristics including, for example, the sensitivity of the system resource being requested.

Although the flows 150-172 are described in a relatively serial manner, it should be appreciated that various blocks of the method 101 may be performed in parallel in some embodiments.

Referring now to FIG. 2, a simplified block diagram of at least one embodiment of a communications infrastructure and/or content center system, which may be used in conjunction with one or more of the embodiments described herein, is shown. The contact center system 200 may be embodied as any system capable of providing contact center services (e.g., call center services, chat center services, SMS center services, etc.) to an end user and otherwise performing the functions described herein. The illustrative contact center system 200 includes a customer device 205, a network 210, a switch/media gateway 212, a call controller 214, an interactive media response (IMR) server 216, a routing server 218, a storage device 220, a statistics server 226, agent devices 230A, 230B, 230C, a media server 234, a knowledge management server 236, a knowledge system 238, chat server 240, web servers 242, an interaction (iXn) server 244, a universal contact server 246, a reporting server 248, a media services server 249, and an analytics module 250. Although only one customer device 205, one network 210, one switch/media gateway 212, one call controller 214, one IMR server 216, one routing server 218, one storage device 220, one statistics server 226, one media server 234, one knowledge management server 236, one knowledge system 238, one chat server 240, one iXn server 244, one universal contact server 246, one reporting server 248, one media services server 249, and one analytics module 250 are shown in the illustrative embodiment of FIG. 2, the contact center system 200 may include multiple customer devices 205, networks 210, switch/media gateways 212, call controllers 214, IMR servers 216, routing servers 218, storage devices 220, statistics servers 226, media servers 234, knowledge management servers 236, knowledge systems 238, chat servers 240, iXn servers 244, universal contact servers 246, reporting servers 248, media services servers 249, and/or analytics modules 250 in other embodiments. Further, in some embodiments, one or more of the components described herein may be excluded from the system 200, one or more of the components described as being independent may form a portion of another component, and/or one or more of the component described as forming a portion of another component may be independent.

It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another embodiment, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 300, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

It should be understood that any of the computer-implemented components, modules, or servers described in relation to FIG. 2 may be implemented via one or more types of computing devices, such as, for example, the computing device 300 of FIG. 3. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 200 may initiate inbound communications (e.g., telephone calls, emails, chats, etc.) to the contact center system 200 via a customer device 205. While FIG. 2 shows one such customer device—i.e., customer devices 205—it should be understood that any number of customer devices 205 may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of the network typically depending on the type of customer device being used and the form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 212 may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 212 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, and/or other types of calls. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

The interactive media response (IMR) server 216 may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may instruct customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment (e.g. Genesys® Designer).

The routing server 218 may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described herein, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

It should be appreciated that the contact center system 200 may include one or more mass storage devices—represented generally by the storage device 220—for storing data in one or more databases relevant to the functioning of the contact center. For example, the storage device 220 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database. Agent data maintained by the contact center system 200 may include, for example, agent availability and agent profiles, schedules, skills, handle time, and/or other relevant data. As another example, the storage device 220 may store interaction data in an interaction database. Interaction data may include, for example, data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therein or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 226 may be configured to record and aggregate data relating to the performance and operational aspects of the contact center system 200. Such information may be compiled by the statistics server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center system 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. Although FIG. 2 shows three such agent devices 230—i.e., agent devices 230A, 230B and 230C—it should be understood that any number of agent devices 230 may be present in a particular embodiment.

The multimedia/social media server 234 may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 236 may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials. As an example, the knowledge system 238 may be embodied as IBM Watson or a similar system.

The chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage, and facilitate user interfaces (UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 236 and the knowledge systems 238 for receiving suggestions and answers to queries posed by customers during a chat so that, for example, links to relevant articles can be provided.

The web servers 242 may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 244 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferrable activities. Once assigned to a particular agent, the deferrable activity is pushed to that agent so that it appears on the agent device 230 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 230 may include a workbin. As an example, a workbin may be maintained in the buffer memory of the corresponding agent device 230.

The universal contact server (UCS) 246 may be configured to retrieve information stored in the customer database and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 249 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 250 may be configured to provide systems and methods for performing analytics on data received from a plurality of different data sources as functionality described herein may require. In accordance with example embodiments, the analytics module 250 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database and agent database. The analytics module 250 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 250 may be configured to retrieve data stored within the storage device 220 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms. At least one embodiment of a neural network architecture/model 400 involving multihead attention is depicted in reference to FIG. 4.

The analytics module 250 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 250 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment. It should be appreciated that each of the devices of the call center system 200 may be embodied as, include, or form a portion of one or more computing devices similar to the computing device 300 described below in reference to FIG. 3.

Referring now to FIG. 3, a simplified block diagram of at least one embodiment of a computing device 300 is shown. The illustrative computing device 300 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 300, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2—the various servers and computer devices thereof may be located on local computing devices 300 (e.g., on-site at the same physical location as the agents of the contact center), remote computing devices 300 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as one or more of the devices/systems described herein, and/or a portion thereof. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

The computing device 300 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 300 may communicate with other computing devices 300 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 300 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

What is claimed is:

1. A method of neural network-based pattern analysis for real-time threat detection, the method comprising:
    receiving, by a system, a real-time request for a system resource from a user of the system;
    determining, by the system, a user identifier associated with the user of the system;
    retrieving, by the system, a set of recent requests associated with the user identifier from a short-term buffer;
    analyzing, by the system using machine learning, the real-time request based on the set of recent requests and a neural network model to determine whether the real-time request is suspicious;
    flagging, by the system, the real-time request as a suspicious request in response to a determination that the real-time request is suspicious; and
    automatically disabling, by the system, the user's ability to submit requests to the system in response to flagging at least a threshold number of real-time requests as suspicious requests.

2. The method of claim 1, wherein flagging the real-time request as the suspicious request comprises storing data associated with the real-time request in a suspicious request history database.

3. The method of claim 1, wherein the set of recent requests comprises up to twenty most recent requests by the user.

4. The method of claim 1, wherein receiving the real-time request for the system resource comprises receiving real-time request metadata via an application programming interface (API) of the system.

5. The method of claim 4, further comprising transmitting, by the system, the real-time request metadata to a message bus; and
    wherein analyzing the real-time request comprises extracting the real-time request metadata from the message bus.

6. The method of claim 4, further comprising training, by the system, the neural network model based on the real-time request metadata.

7. The method of claim 1, wherein analyzing the real-time request based on the set of recent requests and the neural network model comprises determining, for each system resource of a plurality of system resources, a probability that a next real-time request is associated with the corresponding system resource.

8. The method of claim 7, wherein determining that the real-time request is suspicious comprises determining that a probability of the real-time request is the next real-time request is below a threshold probability.

9. The method of claim 7, wherein determining that the real-time request is suspicious comprises: determining a set of the next real-time requests having greatest corresponding probabilities; and determining that the real-time request is suspicious in response to determining that the real-time request is not included in the set of the next real-time requests having the greatest corresponding probabilities.

10. The method of claim 9, wherein the set of the next real-time requests comprises a configurable number of requests.

11. A system for neural network-based pattern analysis for real-time threat detection, the system comprising:
   at least one processor; and
   at least one memory comprising a plurality of instructions stored thereon that, in response to execution by the plurality of instructions, causes the system to:
      receive a real-time request for a system resource from a user of the system via an application programming interface (API) of the system;
      determine a user identifier associated with the user of the system;
   retrieve a set of recent requests associated with the user identifier from a short-term buffer;
      analyze, using machine learning, the real-time request based on the set of recent requests and a neural network model to determine whether the real-time request is suspicious;
      flag the real-time request as a suspicious request in response to a determination that the real-time request is suspicious; and
      automatically disable the user's ability to submit requests to the system in response to a determination that at least a threshold number of real-time requests have been flagged as suspicious requests.

12. The system of claim 11, wherein the at least one memory comprises a suspicious request history database; and wherein to flag the real-time request as the suspicious request comprises to store data associated with the real-time request in the suspicious request history database.

13. The system of claim 11, wherein the plurality of instructions further causes the system to transmit the real-time request to a message bus; and wherein to analyze the real-time request comprises to extract the real-time request from the message bus.

14. The system of claim 11, wherein the plurality of instructions further causes the system to train the neural network model based on the real-time request.

15. The system of claim 11, wherein the set of recent requests comprises up to twenty most recent requests by the user.

16. The system of claim 11, wherein to analyze the real-time request based on the set of recent requests and the neural network model comprises to determine, for each system resource of a plurality of system resources, a probability that a next real-time request is associated with the corresponding system resource.

17. The system of claim 16, wherein to determine that the real-time request is suspicious comprises to: determine a set of the next real-time requests having greatest corresponding probabilities; and
   determine that the real-time request is suspicious in response to a determination that the real-time request is not included in the set of the next real-time requests having the greatest corresponding probabilities.

18. The system of claim 16, wherein to determine that the real-time request is suspicious comprises to determine that a probability of the real-time request is the next real-time request is below a threshold probability.

\* \* \* \* \*